United States Patent [19]
Bernard

[11] 3,961,586
[45] June 8, 1976

[54] SHELVING

[76] Inventor: Claude Bernard, 6, rue de la Fraiche, 25500 Morteau (Doubs), France

[22] Filed: Aug. 19, 1974

[21] Appl. No.: 498,727

[30] Foreign Application Priority Data
Aug. 24, 1973 France.............................. 73.31303

[52] U.S. Cl................................. 108/111; 211/187; 312/111
[51] Int. Cl.².......................................... A47B 47/04
[58] Field of Search ............ 108/111, 91, 101, 109; 211/148; 248/239, 250; 312/108, 111; 403/219

[56] References Cited
UNITED STATES PATENTS

| | | | |
|---|---|---|---|
| 721,292 | 2/1903 | Forster................................. | 312/111 |
| 1,030,279 | 6/1912 | Browne................................ | 312/108 |
| 2,104,831 | 1/1938 | Dauskardt...................... | 248/239 X |
| 2,258,909 | 10/1941 | Reens............................. | 312/111 X |
| 3,207,322 | 9/1965 | Pedersen.......................... | 248/239 X |
| 3,234,896 | 2/1966 | Bonsall ................................ | 108/111 |
| 3,331,514 | 9/1967 | Bruynzeel...................... | 248/250 X |
| 3,389,666 | 6/1968 | Bonatz........................... | 108/101 X |
| 3,489,392 | 1/1970 | Thom.............................. | 403/219 X |
| 3,685,465 | 8/1972 | Haumer............................... | 108/111 |
| 3,834,776 | 9/1974 | Becker................................ | 312/111 |
| 3,835,354 | 9/1974 | Pena................................... | 108/111 |

*Primary Examiner*—Francis K. Zugel
*Attorney, Agent, or Firm*—Clarence A. O'Brien; Harvey B. Jacobson

[57] ABSTRACT

Shelving comprising vertical and horizontal members interconnected to provide lateral uprights, horizontal shelves and a back, these members being interconnected by unitary connecting parts which fit into recesses in the vertical members at the joints thereof and provide extensions from joints with a pin insertable into a blind hole in a horizontal member. These connecting parts prevent relative movement between the adjacent vertical members and horizontal members.

3 Claims, 5 Drawing Figures

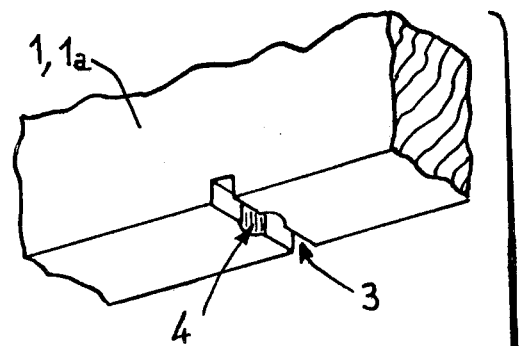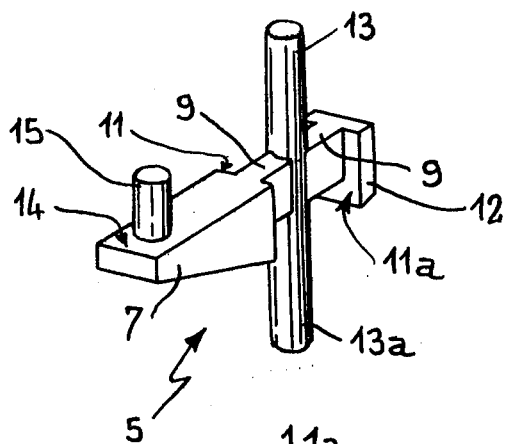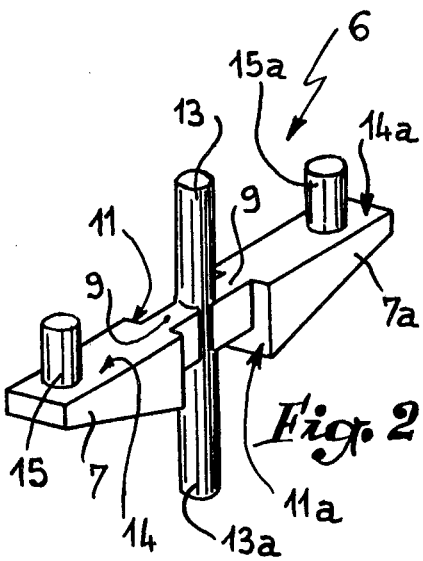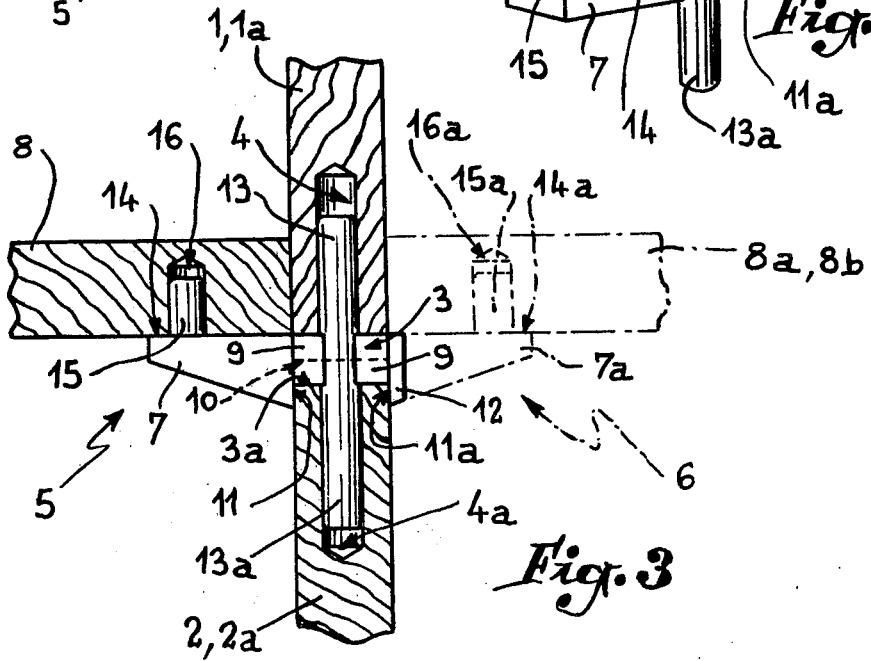

SHELVING

The invention relates to shelving able to be produced by assembling vertical planks, forming lateral uprights and possibly, a back part for support and horizontal planks forming shelves.

Above all, its object is to provide the user with a set of planks of appropriately chosen dimensions and simple assembly means, allowing him to assemble shelving of different configurations, without any tools, appropriately adapting the shelving to the space available and to the dimensions of the objects to be placed on the shelves.

Its object is also to enable the same user to dismantle it without any tools and to recover the members of this shelving intact either to store them with minimum bulk or by a different assembly, to adapt them to new conditions and to modify the distance between certain shelves depending on the varying height of other objects to be placed on these shelves.

It relates mainly to the storage and/or display of articles. Consequently, it is used in libraries, stores, exhibition stands, warehouses and on board certain transportation, breakdown or exhibition vehicles.

However, the invention will be better understood with reference to the following description and to the accompanying drawings, which description and drawings, given as an example, will reveal other objectives and advantages as well as the main features of the invention, the main ones of which are defined in the attached Claims.

FIG. 1 of the said drawings is a perspective view of a connecting piece made in one part constructed according to the invention and one of two vertical planks arranged specially to facilitate its assembly to another plank, similarly arranged according to the invention to facilitate the assembly, without tools, of a lateral or rear (back) upright of shelving according to the invention.

FIG. 2, also a perspective view, shows a connecting-piece made in one part constructed according to a variation.

FIG. 3 is an elevational view of the co-operation of the one part connecting-pieces shown in two variations in the first two figures with vertical and horizontal planks specially arranged for this co-operation, to form shelving according to the invention.

Figure 4:
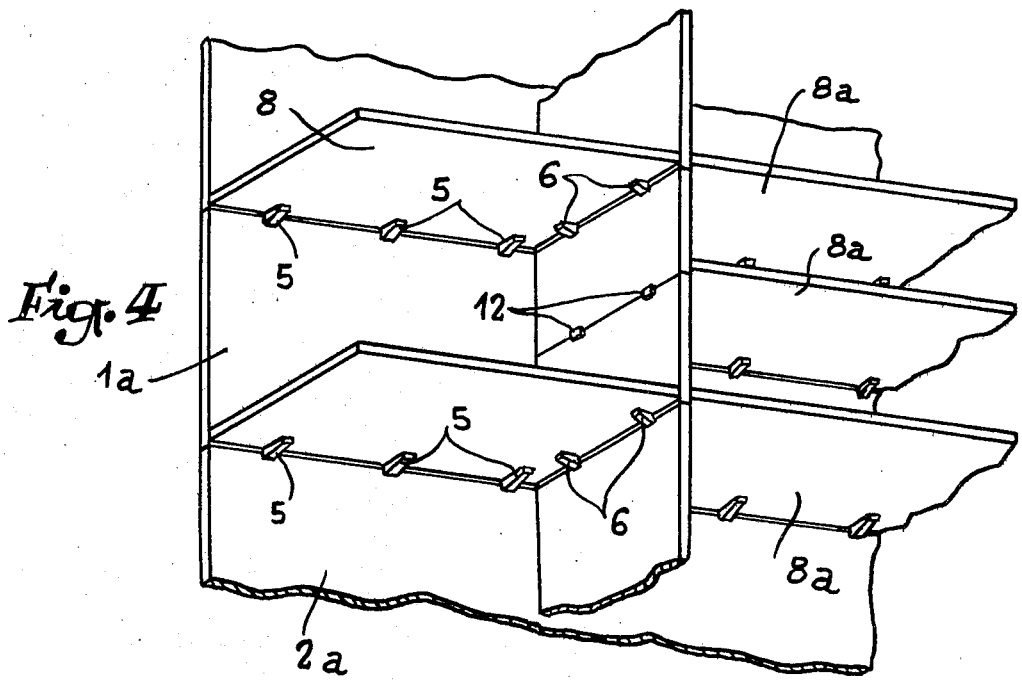
FIG. 4 is a perspective view of part of single shelving according to the invention, as may be assembled by means of planks and connecting parts as shown in FIGS. 1 to 3, for example in front of a wall or partition.

With a view to assembling shelving without tools, by assembling vertical planks forming lateral uprights and a back support part and horizontal planks forming supported shelves, there is provided according to the invention, for the lateral uprights and the shelves, a set of planks of the same depth, whereof at least the planks 1 and 2, which are to constitute the lateral uprights, are of different lengths, the planks of each length appearing at least in twos in this set. As regards the planks 1a and 2a, forming part of the same set to constitute the rear uprights, i.e. the back part, there is one for each pair of lateral uprights 1 and 2, its width corresponding to the single or possibly multiple length of the latter, whereas its length corresponds substantially to that of the horizontal planks, behind which it is to be mounted.

This being so, one-piece connecting parts are used, designated generally by the reference numeral 5 or 6, constructed so that they are able to ensure the end-to-end joining of two vertical planks 1, 2 by their insertion in the joint between these planks and, by interlocking with the latter, to align them in one plane and moreover, designed to constitute a bracket 7 and possibly 7a projecting laterally on the planks 1 and 2 or 1a and 2a to serve as a support for a horizontal plank, 8, 8a, 8b respectively, able to serve as a shelf, as may be seen in FIG. 3.

The one-piece connecting parts 5 or 6 each comprise a cross-member 9 of substantially rectangular section, arranged edgewise and fitted in the groove 3 of complementary shape provided, according to the invention, through the edge at least of the vertical plank 1 or 1a, such that the end-to-end joining of two vertical planks 1 and 2 or 1a and 2a may take place with edges touching around this cross-member 9.

According to one advantageous embodiment, there are respectively provided in each of the vertical planks 1 and 2 or 1a and 2a, grooves 3 and 3a of the same depth, substantially equal to half the height of the cross-member 9, which makes it possible to lock the two planks 1 and 2 or 1a and 2a with respect to each other to prevent any translation along the abutment joint 10 in their common vertical plane, by means of the cross-member 9, as shown in FIG. 3.

At its two ends, the cross-member 9 of the one-piece connecting part 5 or 6 advantageously comprises extensions projecting radially, constituting opposed shoulders 11 and 11c bearing, in the manner of the jaws of a gripper, in the region of the abutment joint 10 of the two planks 1 and 2 or 1a and 2a, on the two large opposite sides of at least one of the latter.

In the case of the embodiment illustrated in the drawing, each shoulder 11 or 11a surrounds the rectangular cross-member 9 both on its lateral sides and its lower side, which facilitates a particularly effective fitting of the connecting part 5 or 6 edgewise on the plank 2 and in the case of the arrangement shown in FIG. 3, provides a similar fitting for the upper vertical plank 1 or 1a, at the same time concealing the edges of the grooves 3 and 3a.

At least one of the projections which extend beyond the shoulders 11 or 11a advantageously constitutes a support bracket 7 or 7a for a horizontal plank 8 or 8a intended to form a shelf.

In the case where on one side of the vertical planks 1 and 2 or 1a and 2a, there is no shelf 8a or 8b, the bracket 7a may be replaced by a simple flat head 12, as provided on the one-piece connecting part 5, as shown in FIG. 1 and in full line in FIG. 3.

According to the invention, it is possible to further improve the fitting of the various planks 1, 2, 1a, 2a, 8, 8a, and 8b on the one-piece connecting parts, 5 and 6 respectively, by completing the latter in the following manner.

Towards its centre, the cross-member 9 may firstly have at least one cylindrical rod 13, engaged in the manner of an assemby pin in a bore 4 provided for this purpose in the edge of the vertical plank 1 or 1a. Advantageously, the same type of pin assembly is provided for the lower plank 2 or 2a, the part 5 or 6 comprising two coaxial rods 13 and 13a projecting in opposite directions at the centre of the cross-member 9, one upwards and the other downwards, these rods being inserted with friction in the corresponding bores 4 and 4a. In an assembly of this type, not only do the monoblock pins 13–13a complete the fitting of the cross-member 9 in the grooves 3 and 3a and of the shoulders 11 and 11a on the edges of the planks by an additional fitting, also adding a friction effect capable of opposing disconnection, but also preventing the upper plank 1 or 1a from being able to pivot on the lower plank 2 or 2a, when it is in the position illustrated in FIG. 3, towards the left or right. In other words, the connection by means of pins 13 and 13a and bores 4 and 4a in the planks 1 and 2 opposes any possible buckling of the shelving uprights.

It is also possible to provide a cylindrical lug 15, 15a respectively, projecting from the flat surface 14 or 14a of each bracket 7 or 7a serving as a support for the horizontal plank 8, 8a or 8b forming a shelf and which lug is engaged in a blind hole 16, 16a provided in alignment in the lower side of said plank 8, 8a respectively, in order to lock it against the vertical planks 1 or 1a, to prevent any horizontal translatory movement.

As regards the connecting parts, whether having the configuration shown at 5 or 6, they are advantageously produced by moulding, in particular by injection moulding. They may be made from metal or an appropriate plastics material such as a polyamide. The impression mould complementing the connecting part 5 or 6 is naturally part of the invention.

In practice, two connecting parts 5 or 6 are provided between each pair of vertical planks 1 and 2, one part situated towards the front and the other towards the rear in the configuration shown in FIG. 3, i.e. one in the plane of the drawing and the other at the front or rear of this plane.

Figure 5:
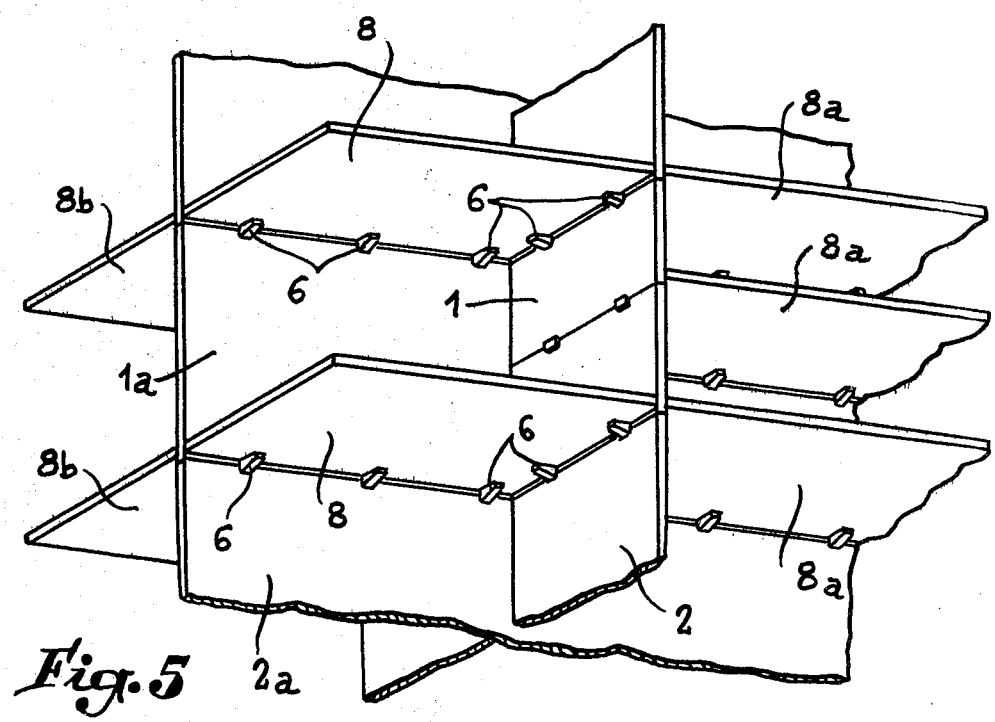
FIG. 5 is also a perspective view of part of double shelving mounted according to a variation, with the same planks and connecting parts, in particular to form an intermediate partition, having shelving on both sides, in a space used for the purposes of an exhibition and/or selling.

The rigidity already obtained by the lateral uprights 1 and 2 may be increased considerably by the addition of rear uprights 1a and 2a forming a back, as shown in FIGS. 4 and 5.

The assembly of the two rear vertical uprights 1a and 2a, placed end-to-end, takes place in the same manner as the assembly of the lateral uprights 1 and 2 by means of at least two or more connecting parts 5 or 6.

In the case of single shelving, such as that shown in FIG. 4, the parts ensuring the connection between the uprights 1a and 2a of the back and the support of the shelves 8 along their rear edge — the number of these parts being essentially dependent on the length of this edge — are of the type having a single bracket 7, such as that designated by the reference numeral 5 in FIG. 1 or shown in full line in FIG. 3.

According to the invention, with the same type of planks 1, 2, 1a, 2a, 8 and the same type of connecting parts 5 and 6, it is possible to produce double-sided shelving, i.e. which comprises a series of shelves 8, 8a and 8b on each side of the back 1a, 2a, as shown in FIG. 5. Shelving of this type makes it possible to sub-divide an area used for an exhibition or for selling, by intermediate partitions making it possible to shepherd visitors or buyers along a display of very great length, at various levels. In this case, the rear uprights 1a and 2a, which are identical to those of FIG. 4, are interconnected, not by connecting parts 5, but by connecting parts 6, such as that shown in FIG. 2 and which, due to a second bracket 7a, make it possible to support and attach to a lug 15a, the projecting shelves 8b opposite the shelves (8) on the back 1a, 2a.

As a consequence, and whatever the embodiment adopted, one is able to produce — with a small number of connecting parts 5 and 6 of various configurations and planks 1, 2, 1a, 2a, 8, 8a, 8b, which have been previously provided with grooves 3 and bores 4 according to the invention — a set of members allowing any user to rapidly assemble, without any tools, shelving adapted by its dimensions and its shape to the space available for its installation and, secondly, by the elimination of one or more intermediate shelves, to easily adapt the space on these shelves to the dimensions and in particular the height of the objects to be placed thereon. In addition, the user is able, at any instant, to dismantle, also without tools, the whole of the shelving, which enables him to store the shelves 8, 8a, 8b and their lateral support uprights 1, 2 and rear uprights 1a, 2a in a flat position, with minimum bulk, when he no longer needs them or even to re-assemble them in a different arrangement, adapted to other locations or other objects to be arranged or exhibited.

It should also be understood that the preceding description was given solely as an example and that it in no way limits the scope of the invention, from which one would not diverge if the details described were replaced by other equivalent measures.

What is claimed is:

1. Collapsible shelving having rectangular boards laterally supported by vertical boards and rearwardly supported by vertically superposed rectangular boards having abutting edges joining tightly substantially along one of said horizontal boards and including at least one connecting part having projecting means thereon, each such means being inserted in a bore in a corresponding board, perpendicularly in respect to the direction of said abutting edges, so as to prevent said boards from moving laterally with respect to each other and prevent the shelving from breaking down laterally, each connecting part is located perpendicularly to the joint between adjacent vertical boards, the part having a cross-member of substantially rectangular section for fitment into a groove of complementary shape in the edge of at least one of the two vertical boards, the cross-member comprising extensions projecting radially from its ends, the extensions forming at least one reduced portion between opposed shoulders gripping in the region of the joint of the two members to be joined on the two large opposed sides of at least one of the latter.

2. Shelving according to claim 1, in which at least one extension is shaped to be a support bracket for a horizontal board.

3. Shelving according to claim 2, in which the connecting part has a cylindrical lug projecting from the flat surface of the support bracket, the lug being engaged in a blind hole provided in the lower side of the horizontal board to be supported in order to prevent any horizontal translatory movement between the lateral vertical support boards.

* * * * *